United States Patent
Lewis et al.

(10) Patent No.: US 8,793,135 B2
(45) Date of Patent: Jul. 29, 2014

(54) SYSTEM AND METHOD FOR AUDITORY CAPTCHAS

(75) Inventors: Steven Hart Lewis, Middletown, NJ (US); John Baldasare, Neptune, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1134 days.

(21) Appl. No.: 12/197,503

(22) Filed: Aug. 25, 2008

(65) Prior Publication Data

US 2010/0049526 A1 Feb. 25, 2010

(51) Int. Cl.
*G10L 21/00* (2013.01)

(52) U.S. Cl.
USPC ............... 704/273; 704/270; 704/275; 726/3; 726/5

(58) Field of Classification Search
USPC .................. 704/246, 270, 273, 275; 726/3, 5
See application file for complete search history.

(56) References Cited

U.S. PATENT DOCUMENTS

| 8,036,902 | B1 * | 10/2011 | Strom et al. | ................... 704/275 |
| 2004/0254793 | A1 * | 12/2004 | Herley et al. | ................. 704/270 |
| 2006/0136219 | A1 * | 6/2006 | Wang | ............................. 704/273 |
| 2010/0031330 | A1 * | 2/2010 | Von Ahn et al. | ................... 726/5 |
| 2010/0095350 | A1 * | 4/2010 | Lazar et al. | ........................ 726/3 |

OTHER PUBLICATIONS

"Proposal for an Accessible Captcha—Standars-schmandards" Internet archive date Nov. 8, 2006, http://www.standards-schmandards.com/2005/captcha/.*

* cited by examiner

*Primary Examiner* — Vincent P Harper

(57) ABSTRACT

Disclosed herein are systems, methods, and computer readable-media for performing an audible human verification. The method includes determining that a human verification is needed, presenting an audible challenge to a user which exploits a known issue with automatic speech recognition processes, receiving a response to the audible challenge, and verifying that a human provided the response. The known issue with automatic speech recognition processes can be recognition of a non-word, in which case the user can be asked to spell the recognized non-word. The known issue with automatic speech recognition processes can be differentiation of simultaneous input for multiple audio streams. Multiple audio streams contained in the audible challenge can be provided monaurally. Verifying that a human provided the response can include confirming the contents of one of the multiple audio streams. Audible human verification can be performed in combination with visual human verification.

17 Claims, 5 Drawing Sheets

SYSTEM AND METHOD FOR AUDITORY CAPTCHAS

BACKGROUND OF THE INVENTION

1. Field of the Invention

The present invention relates to user verification and more specifically to auditory verification of a human user.

2. Introduction

Computer systems are capable of mimicking human interactions with other computers. One computer can be programmed to fill in forms, submit those forms, and generally behave in an automated way to accomplish certain tasks, especially in on-line forums like bulletin boards, blogs, online polls, commerce sites, and so forth. While many such automation tasks are benign and even helpful, the same technology can be used to automate fraud and/or attacks. In response to increasing automated attacks, the concept of a Completely Automated Public Turing test to tell Computers and Humans Apart, or CAPTCHA, was conceived. A CAPTCHA is an image designed to be difficult or impossible to solve in an automated way, but also designed so that most humans can solve the CAPTCHA. An ideal CAPTCHA also retains these two attributes even after many websites implement it.

A CAPTCHA graphic usually contains numbers, letters, or some combination of characters. Typically a visual CAPTCHA further employs one or more of the following techniques to alter the text in order to frustrate would-be automated attacks: warping, distorting the background, adding noise, crowding characters together, etc. These techniques make optical character recognition (OCR) difficult or impossible, but must not distort the text to the point that a human would also be unable to understand the CAPTCHA contents. In fact, one of the early attempts at CAPTCHAs intentionally exploited known problems in OCR systems by simulating situations that scanner manuals claimed resulted in faulty OCR. Attackers quickly adapted and were able to defeat early rudimentary CAPTCHA technology.

As computing power and OCR technology advances, CAPTCHA creators and would-be attackers using OCR find themselves in a continuing arms race. CAPTCHA creators find a new way to stump automated attacks and attackers work quickly to find a way to work around the problem. Some notable victims in the CAPTCHA arms race who have had their CAPTCHA technology compromised are online heavyweights such as Yahoo, Paypal, Microsoft, and Google. Even successful CAPTCHAs are susceptible to circumvention by means of paying humans in third world countries pennies for each completed CAPTCHA.

With recent discoveries and advancements in automated speech synthesis and recognition, automated interactions are now rapidly spreading to telephone-based interfaces. Automated attacks encountered on the web are now finding their way into automated telephone interfaces. However, the traditional CAPTCHAs which were designed to prevent and/or slow down automated attacks are graphics based. Telephone systems are not typically capable of displaying images, so the graphical CAPTCHA approach is not applicable. An audible CAPTCHA is the only solution universally applicable to all telephones. Efforts to date to create an audible CAPTCHA system simply extend the visual metaphor of degrading the stimulus by adding noise, but such noise is easily filtered out with the help of computer software. Accordingly, what is needed in the art is an improved way to tell humans apart from computers based on audible CAPTCHAs.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for performing an audible human verification. The method includes determining that a human verification is needed, presenting an audible challenge to a user which exploits a known issue with automatic speech recognition processes, receiving a response to the audible challenge, and verifying that a human provided the response. The known issue with automatic speech recognition processes can be recognition of a non-word, in which case the user can be asked to repeat back or spell the recognized non-word. The known issue with automatic speech recognition processes can be differentiation of simultaneous input for multiple audio streams. Multiple audio streams contained in the audible challenge can be provided monaurally. Verifying that a human provided the response can include confirming the contents of one of the multiple audio streams. Audible human verification can be performed in combination with visual human verification. An analogous visual concept is known as a Completely Automated Public Turing Test to tell Computers and Humans Apart, or CAPTCHA. One purpose of CAPTCHAs is to prevent automated abuse of publicly available websites. Many forms of visual CAPTCHAs exist and are constantly refined in response to improving optical character recognition (OCR) technology. This disclosure addresses the need in the auditory field for improved audible CAPTCHAs where more traditional graphical CAPTCHAs are impractical, ineffective, or inadequate.

Since the likely and most common computer processing used to answer auditory challenges is ASR, both disclosed approaches leverage the unique advantages of humans as sensory processors over current capabilities of ASR systems.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
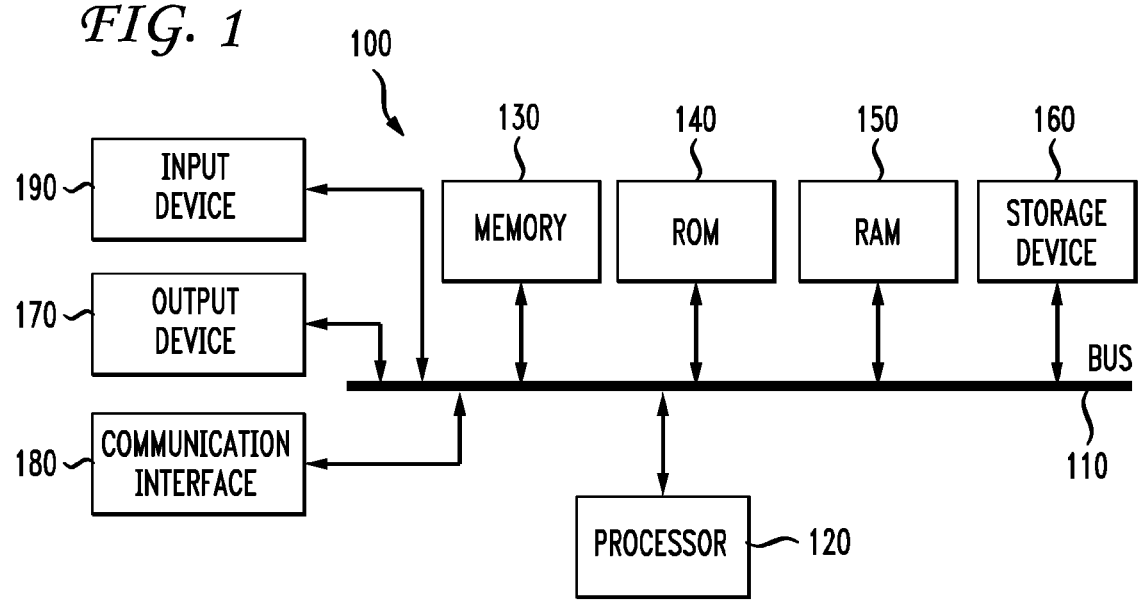
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
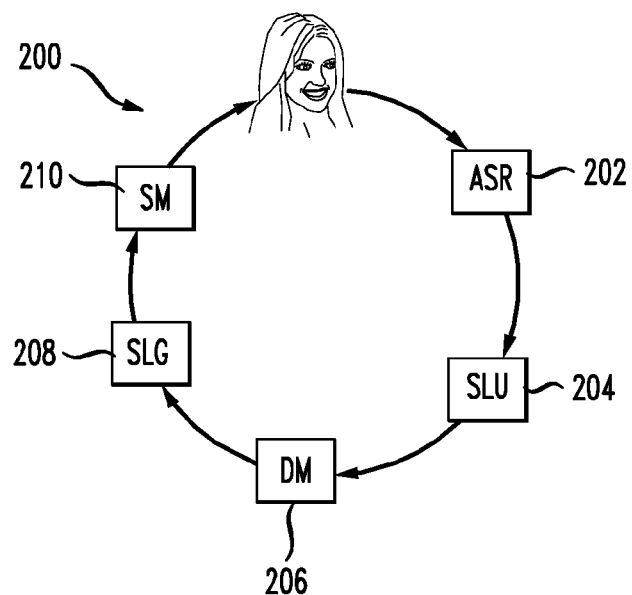
FIG. 2 illustrates a functional block diagram of an exemplary natural language spoken dialog system.

FIG. 2 illustrates a functional block diagram of an exemplary natural language spoken dialog system. The principles of enriched spoken language translation described herein can be implemented as a part of or operate in connection with a natural spoken language dialog system to provide, for example, real-time translation of speech in an automated natural speech interface via telephone. In this manner, a spoken dialog system which is tuned to pick up on and understand prosodically prominent segments of speech can still be effective with foreign languages processed through a translation module. Spoken dialog systems aim to identify intents of humans, expressed in natural language, and take actions accordingly, to satisfy their requests. Natural language spoken dialog system 200 may include an automatic speech recognition (ASR) module 202, a spoken language understanding (SLU) module 204, a dialog management (DM) module 206, a spoken language generation (SLG) module 208, and synthesizing module 210. The synthesizing module may be any type of speech output module. For example, it may be a module wherein one of a plurality of prerecorded speech segments is selected and played to a user. Thus, the synthesizing module represents any type of speech output. The present invention focuses on innovations related to the dialog management module 206 and may also relate to other components of the dialog system.

ASR module 202 may analyze speech input and may provide a transcription of the speech input as output. SLU module 204 may receive the transcribed input and may use a natural language understanding model to analyze the group of words that are included in the transcribed input to derive a meaning from the input. The role of DM module 206 is to interact in a natural way and help the user to achieve the task that the system is designed to support. DM module 206 may receive the meaning of the speech input from SLU module 204 and may determine an action, such as, for example, providing a response, based on the input. SLG module 208 may generate a transcription of one or more words in response to the action provided by DM 206. Synthesizing module 210 may receive the transcription as input and may provide generated audible speech as output based on the transcribed speech.

Thus, the modules of system 200 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 200, which the user then hears. In this manner, the user can carry on a natural language dialog with system 200. Those of ordinary skill in the art will understand the programming languages and means for generating and training ASR module 202 or any of the other modules in the spoken dialog system. Further, the modules of system 200 may operate independent of a full dialog system. For example, a computing device such as a smartphone (or any processing device having a phone capability) may have an ASR module wherein a user may say "call mom" and the smartphone may act on the instruction without a "spoken dialog."

Figure 3:
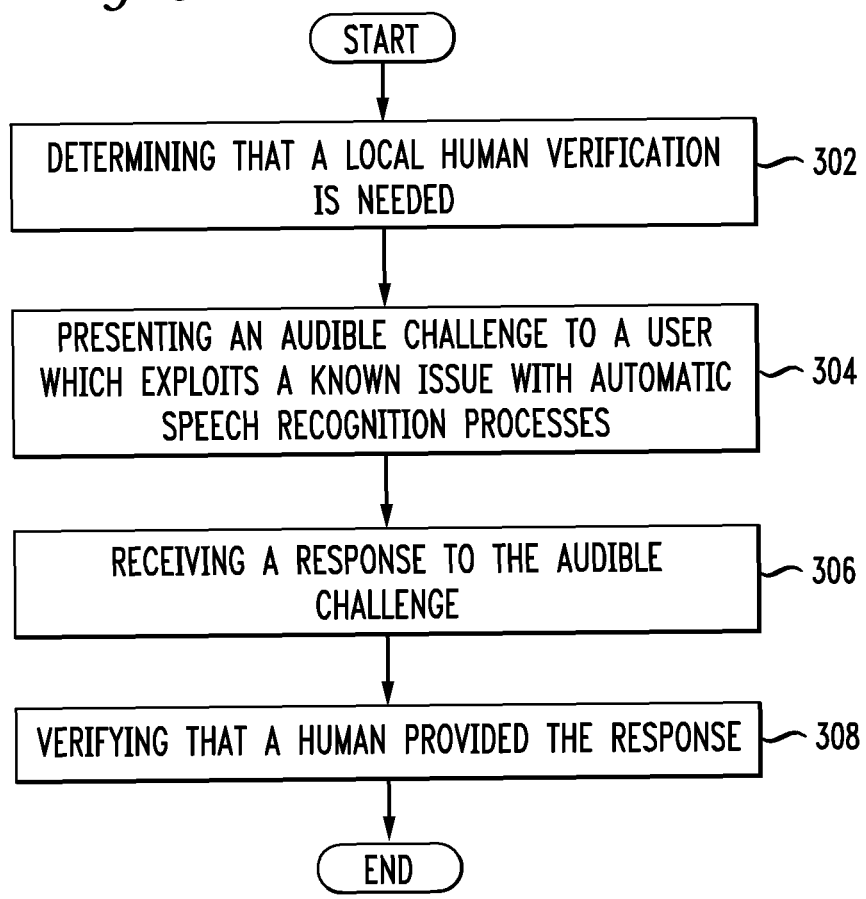
FIG. 3 illustrates an example method embodiment.

Having discussed these fundamental concepts, the disclosure turns to the exemplary method embodiment, variations, and the remaining figures. One of the primary benefits of the principles described herein is the ability to prevent computer robots from automatically logging in and registering for services by screening them out. FIG. 3 illustrates an example method embodiment. The method includes first determining that a human verification is needed (302). A system with a telephone-based interface can make such a determination. A web-based system can also decide to employ an auditory CAPTCHA through a computer speaker, a microphone, a keyboard, and/or mouse. For example, if a caller is interacting with a speech-based interface for a bank and the caller wants to transfer funds, the bank's system can decide that it needs to verify that the caller is a person, not an automated attacker. A human determination can be provided in addition to and/or in combination with other security measures. For instance, while the caller to the bank has likely already entered account information and provided sufficient means of identification, the human verification can prevent would-be identity thieves from committing automated abuse of the bank's speech-based interface with stolen information.

Auditory CAPTCHAs can be combined with voice authorization security measures known commonly as speaker verification. A spoken response to an auditory CAPTCHA can be retained and compared to an authorized speech sample to verify that not only is the speaker a human, but that the speaker is a particular, authorized human. This particular aspect may be useful in conjunction with automated credit card transactions over the phone.

Auditory CAPTCHAs can also be combined with security through something a speaker knows. An auditory CAPTCHA can prompt a voice response that serves two purposes. First, the voice response can demonstrate that a person, and not an automated system, is providing the voice response. Second, the voice response can demonstrate that the person knows a particular piece of information such as a password, passphrase, operator ID, etc. Such a prompt could contain two voices, for example one female and one male, one of which prompts the user "Please state the color of the sky followed by your passphrase." The voice response can then not only verify that the response comes from a person because she can pick out the prompt from two voices, but can also respond to the question and provide a valid passphrase. Combinations with other security techniques exist and should be readily apparent to one of skill in the art.

Next the method includes presenting an audible challenge to a user which exploits a known issue with automatic speech recognition processes (304). Two primary known issues with automatic speech recognition are easily exploitable. Other issues with ASR processes exist and may be exploited in their own unique ways. Two primary issues are discussed by way of example, but should not be considered limiting of the scope of the invention. The first known issue is recognition of a non-word. As non-words are not in an ASR grammar, a computer system or automated ASR bot would not recognize such a non-word, whereas a person would have no problem recognizing a non-word and conjecturing as to a likely spelling. Some examples of non-words are "clammage", "brillig", "poiled", "skring", etc. One way to demonstrate recognition of a non-word is to require a listener to spell the recognized non-word. One approach to verify spelling is to provide a table of acceptable spellings for each non-word. For instance, a user who is asked to spell "clammage" may think it is etymologically similar to "rummage" and spell it with two Ms, or she may think it is similar to the word "damage" and spell it with one M. A table of spellings includes satisfactory variations.

The second known issue in ASR systems is differentiation of simultaneous input for multiple audio streams. The multiple audio streams can be, for example, a male and a female voice, or an adult's and a child's voice, speaking different things at the same time. One way to demonstrate recognition and understanding is to simply ask what one of these voices stated. ASR technology is currently incapable of segregating two or more simultaneous auditory streams, but this is a trivial task for the human ear and brain. To prevent obvious attack tricks, if the audible challenge is provided in digital form such as an MP3 file, the multiple audio streams contained in the audible challenge can be provided monaurally in a single, merged structure. An automated attack to defeat an audio CAPTCHA with multiple streams could easily separate out tracks, such as stereo track information. A monaural digital file contains only one track which is not easily divisible, if at all.

These two known issues with ASR systems are combinable. For example, a CAPTCHA could include two simultaneous audio streams which say different words, one a real word and the other a non-word. The user can be asked to identify and spell the non-word. In this manner, two nearly impossible hurdles are presented for an ASR system, while a person can easily discern the two words, identify the non-word, and formulate a possible spelling. Other ASR issues can be discovered and combined with known issues. As ASR technology advances, issues can shift, alter, disappear, and reappear in various forms. It is anticipated that audio CAPTCHAs will evolve along with issues in the current level of ASR technology.

Next the method includes receiving a response to the audible challenge (306). A user or an automated system provides a response to the audible challenge. The response can be speech, button presses, typed words, mouse clicks, silence, an uploaded file or any other suitable type of input. Finally, the method includes verifying that a human provided the response (308). In the case of multiple audio streams, verifying that a human provided the response can include confirming the contents of one or more of the multiple audio streams or answering a question about the contents of one or more of the multiple audio streams. In the case of non-words, verifying that a human provided the response can include checking a spoken or typed spelling of a word against a database of acceptable spellings.

The audible human verification described herein can be performed in combination with graphical CAPTCHAs or other human verification schemes. In some cases, both the audible and visual CAPTCHAs are related to and integral to each other, so that one or the other is unusable without the other. For example, a visual CAPTCHA can be presented that is severely distorted and nearly impossible for a human to read. In combination with an audio CAPTCHA as described herein, a clue is provided to allow a human to understand the visual CAPTCHA. In this way, a dual-factor test for a human is applied so that even if a machine is able to decode one or the other, the entire scheme is not compromised.

A telephone caller can initiate human verification to verify that the other party is a person. For example, a homeowner can establish an audio CAPTCHA to "guard" her home phone line. Every caller to the homeowner must pass an audio CAPTCHA to gain access and place a call. While this may be a slight annoyance to many human callers, the homeowner can balance that slight annoyance with the desire to avoid calls from automated systems. Alternately, the homeowner can provide a whitelist of numbers which are not subject to the audio CAPTCHA while all other numbers must pass the audio CAPTCHA to place a call. Such a CAPTCHA can be modified even further to ensure that the caller is not only a human, but a human who knows the homeowner. If the audio CAPTCHA is of the multiple audio stream kind, one of the audio streams may be the homeowner's voice. The question of the CAPTCHA could ask, "Is the homeowner's voice one of the voices presented?" or "What is the homeowner saying in this clip?" In this way, not only are automated telemarketers blocked from making calls, but also humans who are unfamiliar with the homeowner's voice, such as human telemarketers.

Figure 4:
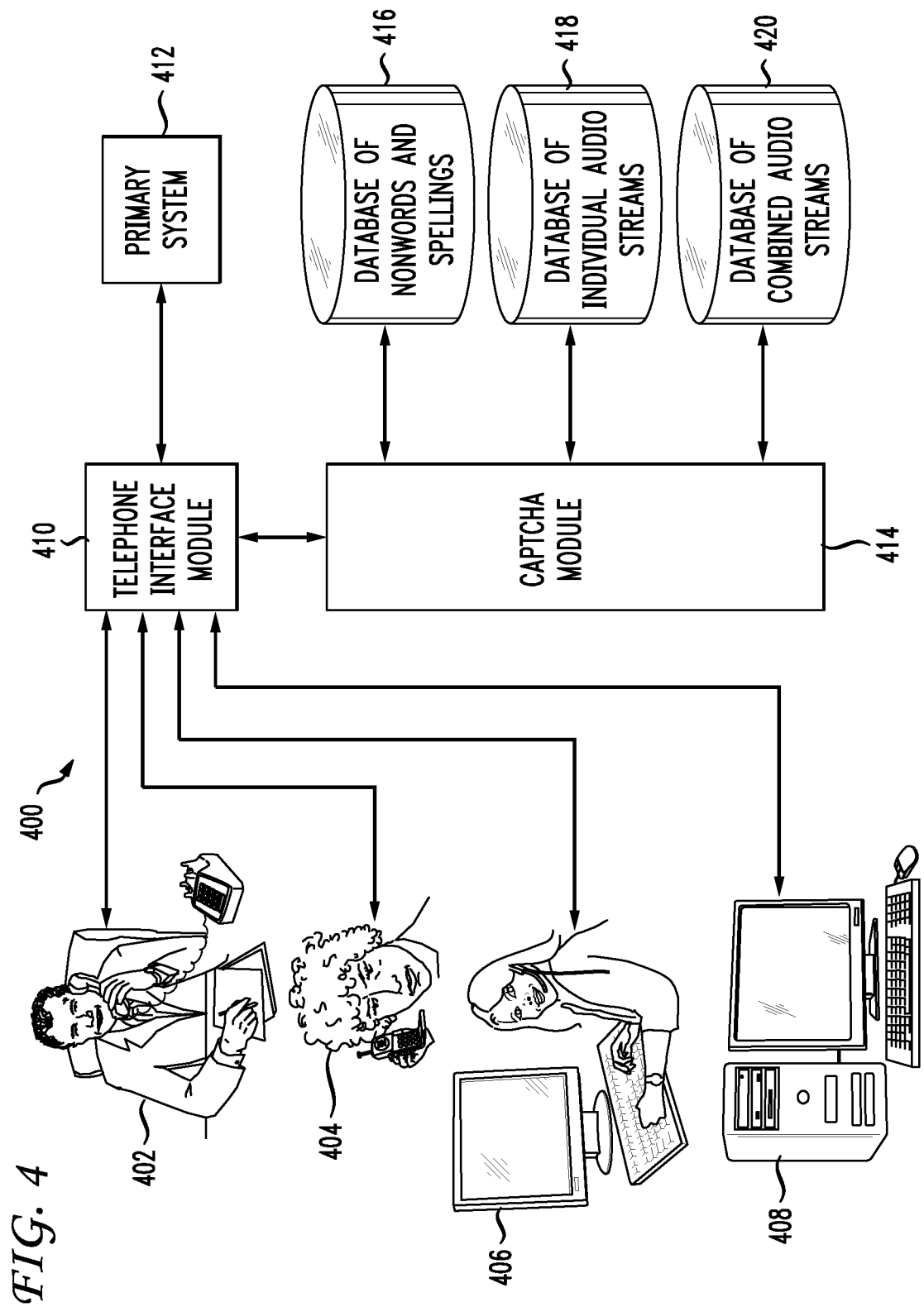
FIG. 4 illustrates an example system embodiment.

FIG. 4 illustrates an example system embodiment. An example audio CAPTCHA system 400 accepts telephone calls from callers using landlines 402, callers using cellular phones 404, callers using VoIP software on a personal computer 406, and computers 408 by themselves via modem or other devices capable of communicating via a telephone connection. A typical audio CAPTCHA system contains a telephone interface module 410 to interact with callers via ASR. In the case of a computer calling by itself, the CAPTCHA system ASR is actually interacting with another ASR designed to attack or spoof the system. While a telephone interface module is shown, the audio CAPTCHA system could be implemented as part of a web server which does not include phone lines at all. The telephone interface module 410 is coupled with a primary system 412 to provide some benefit to callers. Some examples of primary systems include systems to provide access to banking, appointment scheduling, telephonic voting, web sites, online commerce, technical support, insurance claims filing, bill payment, etc. Auditory CAPTCHAs can be applied to almost any currently existing primary system 412 which is accessible via telephone.

When the primary system 412 determines that human verification is needed, it signals the CAPTCHA module 414. The CAPTCHA module 414 is shown as connected to the telephone interface module, but it may be connected to the primary system 412 in addition or it may be connected only to the primary system 412. The CAPTCHA module 414 or the primary system 412 can determine which type of audible challenge to present to the user. In this figure, two types of audible challenges are illustrated: spelling a non-word and understanding a portion of a multi-stream audio signal. In the case of spelling a non-word, the CAPTCHA module 414 retrieves a non-word, such as "skring", and associated spellings, such as "s-k-r-i-n-g, s-c-r-i-n-g, s-c-r-e-e-n-g" from the database of non-words and spellings 416. The CAPTCHA module 414 transmits that information to the telephone interface module 410 which prepares and presents the audible CAPTCHA to the intended user, such as "Spell the imaginary word 'skring'." The user responds to the audible challenge with a spelling, such as "S-C-R-I-N-G". The telephone interface module 410 converts the user's response and transmits it to the CAPTCHA module 414. The CAPTCHA module 414 verifies the response then signals to the primary system 412 whether the user is approved or not.

In the case of understanding a portion of a multi-stream audio signal, the CAPTCHA module 414 can retrieve multiple audio streams from the database of individual audio streams 418 and combine them on the fly. Alternatively, the CAPTCHA module 414 can retrieve pre-combined streams from a database of combined audio streams 420. These two databases 418, 420 can also include associated meaning information such as strings, key words, key phrases, answers to questions in the audio streams, etc. The CAPTCHA module 414 transmits the stream or streams to the telephone interface module 410 which prepares and presents the audible CAPTCHA to the intended user, such as "Please listen to the following audio clip. Afterwards, please answer the question asked by the male speaker." The audio clip contains two voices speaking simultaneously, a female and a male. The female voice says "What ocean is to the west of South America?" The male voice says "What color is the inside of a watermelon?" A human user can very easily distinguish between the two voices and formulate a correct response, "Red". An ASR engine would be unable to properly distinguish between the two audio streams and could not respond in a meaningful fashion. The telephone interface module 410 converts the received response and transmits it to the CAPTCHA module 414. The CAPTCHA module 414 verifies the response then signals to the primary system 412 whether the user is approved or not. Connections shown in FIG. 4 may be direct wired connections, wireless connections, packet-based communications over a network such as the Internet, etc.

Figure 5A:
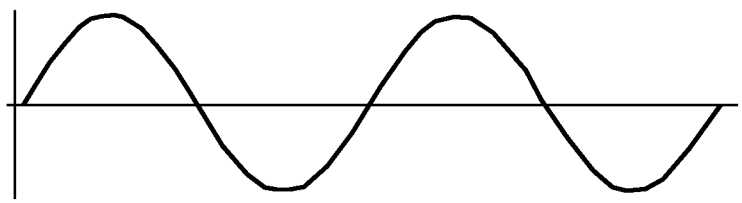
FIG. 5A illustrates a steady wave form.
Figure 5B:
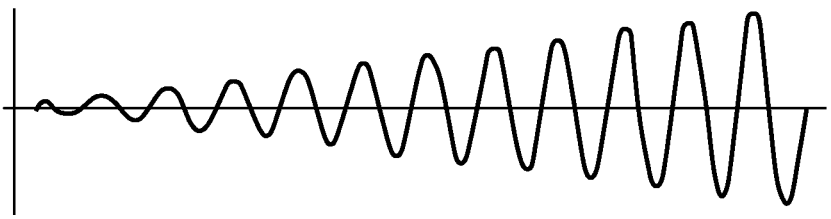
FIG. 5B illustrates an increasing wave form.
Figure 5C:
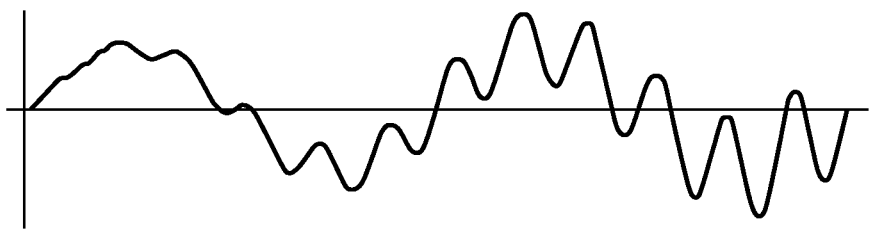
FIG. 5C illustrates the sum of the steady and increasing wave forms.

FIGS. 5A, 5B, and 5C illustrate waveforms of two dissimilar tones and how they can be combined. FIG. 5A illustrates a steady wave form. Such a wave form is consistent with a steady tone, such as a steady beeping noise. The relatively long wavelength means this wave is a lower pitch. FIG. 5B illustrates a wave form which is increasing in amplitude. Such a wave form is consistent with a steady tone that is increasing in volume. The relatively short wavelength means this wave is a higher pitch. FIG. 5C illustrates the sum of the steady and increasing wave forms. FIG. 5C demonstrates the fundamental principle of how to combine waveforms. It is a simple example of how distorted a sum of two signals can become, even when the source signals are "pure" and mathematically simple to express.

Figure 6A:
FIG. 6A illustrates speech wave form 1.
Figure 6B:
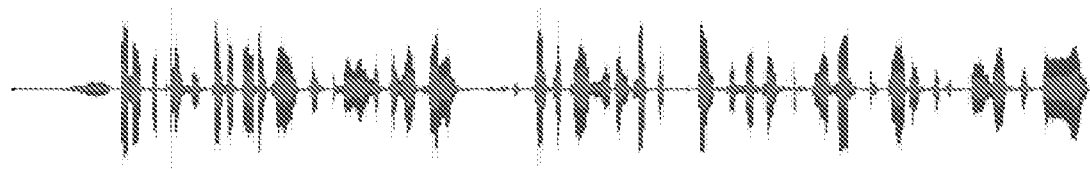
FIG. 6B illustrates speech wave form 2.
Figure 6C:
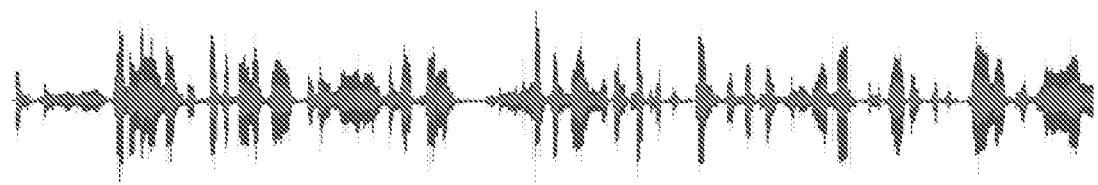
FIG. 6C illustrates the sum of the speech wave forms 1 and 2.

Next, we turn to FIGS. 6A, 6B, and 6C to show how combining multiple audio signals containing speech generates a sum wave that is nearly impossible for a computer to separate into its constituent elements. FIG. 6A illustrates speech wave form 1. It is not consistent or cyclical as shown in FIGS. 5A and 5B. It contains many quiet periods of no speech. It contains waves of varying wavelengths, amplitudes, and frequencies. Overall, it is very representative of the relative low-level chaos of wave forms of conversational speech. FIG. 6B illustrates speech wave form 2. Wave form 2 demonstrates a very different type of wave with different patterns, but still very representative of speech-based waves. Speech recognition is a difficult enough on a single voice, but speech recognition becomes a nearly intractable task when two voices are superimposed one on the other. FIG. 6C illustrates the sum of the speech wave forms 1 and 2. As two complex wave forms are combined, the result is a very messy wave form. A computer-based ASR system is only able to differentiate where one wave form ends and the other one begins with great difficulty, if at all. Such a task is trivial for a human being, however. Humans are able to process and comprehend the wave forms at a very high level without thought about the individual wave forms, whereas a computer is limited to a wave form analysis for understanding of the wave form. This weakness is well known in ASR systems. A wave form like FIG. 6C is capable of straightforward resolution by a person, but not by a computer.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any telephone-based systems or other auditory communication and computer systems where visual analogue is not possible. Those skilled in the art will readily recognize various modifications and changes that may be made to the present invention without following the example embodiments and applications illustrated and described herein, and without departing from the true spirit and scope of the present invention.

We claim:

1. A method comprising:
   presenting a challenge to a user which exploits a known issue with automatic speech recognition processes, where the challenge comprises (1) an audible challenge comprising presenting an audible pronunciation of a non-word pronounced like a single word, wherein the non-word does not exist in a vocabulary of natural languages, and requiring the user to spell the non-word and (2) a visual challenge, the audible challenge being integral to the visual challenge;
   receiving an audible response to the challenge; and
   verifying an identity of the user based on the audible response.

2. The method of claim 1, wherein the known issue with automatic speech recognition processes further comprises spelling of the non-word.

3. The method of claim 1, wherein the known issue with automatic speech recognition processes is differentiation of simultaneous input for multiple audio streams.

4. The method of claim 3, wherein, when the audible challenge is provided in digital form, the multiple audio streams contained in the audible challenge are provided monaurally.

5. The method of claim 3, wherein verifying an identity of the user comprises analyzing the contents of one of the multiple audio streams.

6. The method of claim 1, wherein the visual challenge comprises distorted text.

7. A system comprising:
   a processor; and
   a computer-readable storage medium storing instructions which, when executed on the processor, perform a method comprising:
      presenting a challenge to a user which exploits a known issue with automatic speech recognition processes, where the challenge comprises (1) an audible challenge comprising presenting an audible pronunciation of a non-word pronounced like a single word, wherein the non-word does not exist in a vocabulary of natural languages, and requiring the user to spell the non-word and (2) a visual challenge, the audible challenge being integral to the visual challenge;
      receiving an audible response to the challenge; and
      verifying an identity of the user based on the audible response.

8. The system of claim 7, wherein the known issue with automatic speech recognition processes further comprises spelling of the non-word.

9. The system of claim 7, wherein the known issue with automatic speech recognition processes is differentiation of simultaneous input for multiple audio streams.

10. The system of claim 9, wherein, when the audible challenge is provided in digital form, the multiple audio streams contained in the audible challenge are provided monaurally.

11. The system of claim 9, wherein verifying an identity of the user comprises analyzing the contents of one of the multiple audio streams.

12. The system of claim 7, wherein the visual challenge comprises distorted text.

13. A computer-readable storage device having instructions stored which, when executed by a computing device, perform operations comprising:
    presenting a challenge to a user which exploits a known issue with automatic speech recognition processes, where the challenge comprises (1) an audible challenge comprising presenting an audible pronunciation of a non-word pronounced like a single word, wherein the non-word does not exist in a vocabulary of natural languages, and requiring the user to spell the non-word and (2) a visual challenge, the audible challenge being integral to the visual challenge;
    receiving an audible response to the challenge; and
    verifying an identity of the user based on the audible response.

14. The computer-readable storage device of claim 13, wherein the known issue with automatic speech recognition processes further comprises spelling of the non-word.

15. The computer-readable storage device of claim 13, wherein the known issue with automatic speech recognition processes is differentiation of simultaneous input for multiple audio streams.

16. The computer-readable storage device of claim 15, wherein, when the audible challenge is provided in digital form, the multiple audio streams contained in the audible challenge are provided monaurally.

17. The computer-readable storage device of claim 15, wherein verifying an identity of the user comprises analyzing the contents of one of the multiple audio streams.

* * * * *